United States Patent [19]

Gallagher et al.

[11] Patent Number: 5,853,842
[45] Date of Patent: Dec. 29, 1998

[54] PROCESS FOR THE PRODUCTION OF A MULTI-LAYER COMPOSITE ARTICLE HAVING FASTENERS AFFIXED TO A SURFACE THEREOF AND THE ARTICLE PRODUCED THEREBY

[75] Inventors: Michael Gallagher, Hampton, N.H.; Steven Souders, Plymouth, Mich.

[73] Assignee: Davidson Textron, Inc., Dover, N.H.

[21] Appl. No.: 881,698

[22] Filed: Jun. 25, 1997

Related U.S. Application Data

[62] Division of Ser. No. 576,252, Dec. 21, 1995, Pat. No. 5,725,704.

[51] Int. Cl.$^6$ .................................................. A44B 18/00
[52] U.S. Cl. .......................... 428/99; 24/442; 24/443; 24/444; 24/445; 24/448; 24/450; 24/451; 24/452; 428/100
[58] Field of Search ................. 428/99, 100; 24/452, 24/442, 306, 450, 443, 444, 445, 448, 451

[56] References Cited

U.S. PATENT DOCUMENTS

| | | | |
|---|---|---|---|
| 3,639,195 | 2/1972 | Sanders | 156/62.2 |
| 3,779,446 | 12/1973 | Lemelson | 228/15 |
| 3,993,519 | 11/1976 | Birkhold | 156/73.5 |
| 3,996,082 | 12/1976 | Leatherman | 156/73.5 |
| 4,075,820 | 2/1978 | Standley | 53/329 |
| 4,451,310 | 5/1984 | Lairloup | 156/78 |
| 4,457,795 | 7/1984 | Mason et al. | 156/73.5 |
| 4,477,307 | 10/1984 | Cearlock et al. | 156/580 |
| 4,551,189 | 11/1985 | Peterson | 156/73.5 |
| 4,599,768 | 7/1986 | Doyle et al. | 24/590 |
| 4,626,308 | 12/1986 | Ansell | 156/257 |
| 4,636,124 | 1/1987 | Gugle et al. | 156/73.5 |
| 4,652,415 | 3/1987 | Nguyen et al. | 264/236 |
| 4,676,707 | 6/1987 | Cearlock et al. | 24/683 |
| 4,780,035 | 10/1988 | Shibayama et al. | 156/73.5 |
| 4,832,549 | 5/1989 | Shibayama et al. | 156/73.5 |
| 4,987,714 | 1/1991 | Lemke | 52/410 |
| 5,026,445 | 6/1991 | Mainolfi et al. | 156/73.5 |
| 5,033,925 | 7/1991 | Moghe | 411/366 |
| 5,064,485 | 11/1991 | Smith et al. | 156/69 |
| 5,068,001 | 11/1991 | Haussling | 156/222 |
| 5,089,328 | 2/1992 | Doerer et al. | 428/308.4 |
| 5,108,539 | 4/1992 | Kelley et al. | 156/580 |
| 5,255,485 | 10/1993 | Lemke et al. | 52/410 |
| 5,308,678 | 5/1994 | Tsujimura et al. | 428/182 |
| 5,354,808 | 10/1994 | Onwumere et al. | 524/837 |
| 5,393,474 | 2/1995 | Souders | 264/163 |
| 5,671,511 | 9/1997 | Hattori | 428/100 |
| 5,736,222 | 4/1998 | Childress | 428/99 |

*Primary Examiner*—Nasser Ahmad
*Attorney, Agent, or Firm*—Reising, Ethington, Learman & McCulloch, PLLC

[57] ABSTRACT

A process for the production of a rigid multi-layer composite articles (20) prepared from reacting inter alia a sheet of an open cell foam material (22) impregnated with a binder resin, such as isocyanate resin, to fill the cells of the foam material (22) and a polymerization catalyst to cause the reaction of isocyanate and form isocyanurate linkages, urethane linkages, urea linkages, trimer linkages, biuret linkages, and/or allophante linkages to render the composite article (20) rigid, and having a layer of reinforcing fibers, such as glass fibers, completely (24) or partially (25) impregnated by the binder resin affixed to a surface of the foam material (22) by the binder resin. Fasteners (27) formed of a thermoplastic material are provided having an appropriate adhesion surface. The adhesion surface of each of the fasteners (27) is melted by any of the well known techniques such as spin welding, etc., and caused to engulf the fibers of the layer which are not impregnated or are partially impregnated, or to strip the polymerized resin from the layer of reinforcing fibers which may be completely impregnated and to engulf the stripped fibers. Upon resolidification of the molten material of the fasteners (27), the fasteners (27) are firmly affixed to the layer of reinforcing fibers and thereby to the composite article.

14 Claims, 3 Drawing Sheets

PROCESS FOR THE PRODUCTION OF A MULTI-LAYER COMPOSITE ARTICLE HAVING FASTENERS AFFIXED TO A SURFACE THEREOF AND THE ARTICLE PRODUCED THEREBY

This is a divisional of application Ser. No. 08/576,252 filed on Dec. 21, 1995, now U.S. Pat. No. 5,725,704.

BACKGROUND OF THE INVENTION

1. Technical Field

The present invention relates to a process for preparing lightweight automotive interior trim components and products produced thereby. More particularly, the present invention relates to a process in which a multi-layered composite article is produced using a binder resin with various linkages, and whereby a final product is produced having fastening means formed of a thermoplastic material firmly affixed to a surface of the multi-layered composite article. The invention also relates to the products produced by the present process.

2. Description of Related Art

In the past, light-weight panels having self-supporting cores have been made by methods requiring several steps. One such prior art disclosure is U.S. Pat. No. 5,089,328 to Doerer et al. (hereinafter referred to as Doerer et al. '328 and incorporated herein by reference) which describes a method of making a lightweight multi-layered panel having a cover sheet attached to a self-supporting foam core impregnated with an isocyanate compound which cures when activated to stiffen the impregnated foam core. The cover sheet is bonded to the foam core under heat and pressure in a compression molding operation at a temperature at which activation of the isocyanate compound is accelerated and the foam core layer is rendered self-supporting and less compressible. The isocyanate compound used to impregnate the foam core is typically MDI (4-4'-diphenylmethane di-isocyanate). The MDI is reacted with water and a tertiary amine to accelerate polymerization and to reduce the reaction time of the isocyanate compound.

U.S. Pat. No. 4,451,310 to Lairloup (hereinafter referred to as Lairloup '310 and incorporated herein by reference) discloses a similar process for preparing light-weight, insulating, and semi-rigid or rigid elements. The Lairloup '310 process essentially comprises impregnating a porous open-celled foam core material with an isocyanate and reacting the isocyanate with water thereby forming urea or biuret linkages, rendering the final products thermosetting.

In the prior art set-forth above, since the composite article is formed with thermosetting material, fastening means formed of a thermoplastic material could not be directly affixed thereto without the use of an additional fastener system. In order to overcome this deficiency and to affix fastening means to the composite article, it was necessary to provide apertures extending through the entire thickness of the composite article and to push the shafts of the fastening means through the apertures of the composite article with the shaft and hook of the fastening means extending out the other side and entering into the base material to which the composite article was to be affixed. Another prior art method involved the use of an adhesive to affix the fastener means to the composite article. These deficiencies were present in all the prior art composite articles utilizing thermosetting resins in their formation.

SUMMARY OF THE INVENTION AND ADVANTAGES

In accordance with the present invention, a rigid multi-layer composite article 20 comprises a sheet of an open cell foam material 22, one or more layers of a fibrous reinforcing material 24 disposed on the surfaces of the foam material 22, a polymerized binder dispersed throughout the foam material 22, throughout a part or all of the reinforcing material 24, and adhering the foam material 22 and the fibrous reinforcing material 24 together in fixed rigid relationship, and at least one surface layer 26 adhesively affixed to a surface of the fibrous reinforcing material 24. Additionally, a fastening means 27 formed of a thermoplastic material is melted at its base and the molten material dispersed throughout the fibers of the reinforcing material 24 which are free of the binder, or, alternatively, from which the binder has been physically removed. Upon cooling and resolidification of the thermoplastic material of the fastening means 27, each fastening means 27 remains strongly affixed to exposed segments of the fibrous reinforcing material 24 of the composite article 20.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENTS

The present invention pertains to the utilization of foam core materials that are used in trim panels. Such techniques for preparing such foam core materials are well known in the art. See, for example, U.S. Pat. Nos. 5,308,678; 5,068,001; and 5,393,474, hereby incorporated by reference.

Figure 1:
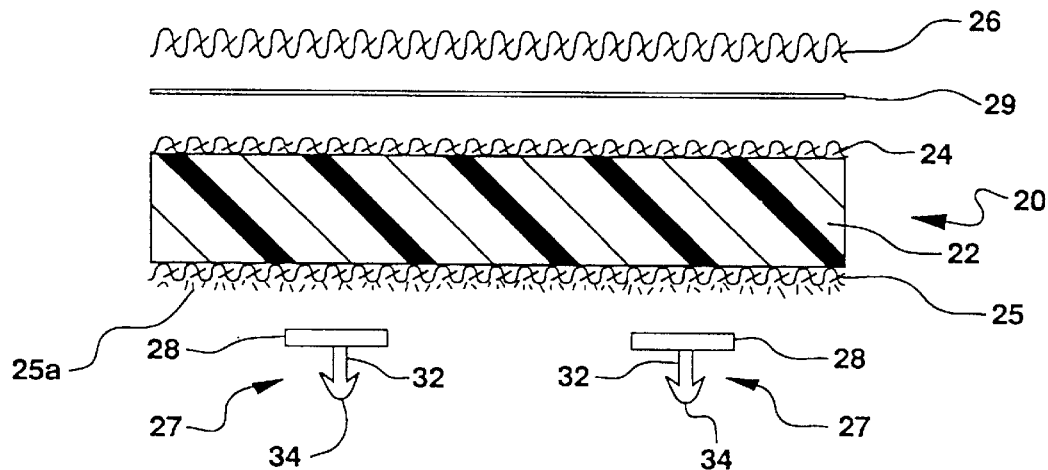
FIG. 1 is an end view of the composite article of the invention wherein the outer portion of a glass fiber reinforced lower reinforcing layer has exposed segments that are not encapsulated by the binder or matrix in which the remainder of the glass fiber reinforcing material is embedded and, also showing fastening means prior to their being affixed to a surface of the reinforcing layer.
Figure 2:
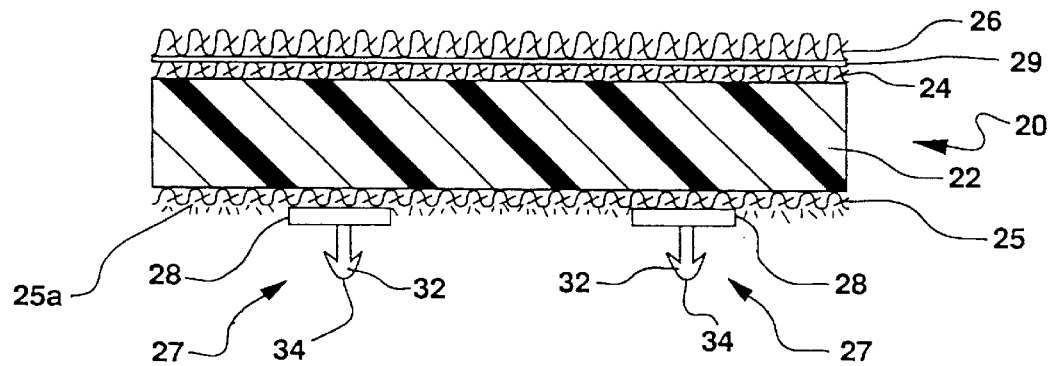
FIG. 2 is an end view of the composite article of the invention shown in FIG. 1, showing the fastening means after they have been affixed to the unencapsulated segments of the reinforcing layer.

Referring to FIGS. 1 and 2, a composite article 20 according to a preferred embodiment of the present invention is shown. The article 20, a panel, is relatively lightweight and flexible. It comprises a foam core 22 having reinforcing layers 24 and 25 located on the surfaces or sides of the foam core 22.

The reinforcing layers 24 and 25 are preferably made of glass fibers. An adhesive layer or film 28 is applied over the reinforcing layer 24 and is used to bond an outer surface layer 26 to the reinforcing layer 24. The outer surface layer 26 comprises the exterior surface of the composite article 20 of the present invention and is utilized for decorative purposes.

The foam core 22 can be of uniform thickness and can be made from soft, flexible sheets of any suitable expanded, reticulated or open cell plastic material such as a polyether, polyolefin, polyester, polyurethane, or any combination thereof.

The foam core 22 is impregnated or saturated with a catalyst-activated, heat accelerated liquid hardening binder which enters and fills the cells of the foam, coating the cell walls.

In preparing the preferred embodiment of the invention, as shown in FIGS. 1 and 2, the binder resin, such as isocyanate, completely permeates and encapsulates the reinforcing layer 24 which serves as the outer layer of the composite article. However, the binder resin only permeates a limited portion of the reinforcing layer 25. As a result, the fibers on the outer surface of the reinforcing layer remain free of the binder resin with it being understood that the segments can be whisker ends, random strand surfaces, or other reinforcing features so long as they are not encapsulated. Consequently when the base 28 of the thermoplastic faster 27 is melted by spin welding or other means well known in the art, the molten material permeates the segments of the fibers of the reinforcing layer which are free of the binder resin. The thermoplastic material of the fastening means 27 is then permitted to cool and solidify, resulting in very strong affixation or mechanical bond of the base 28 of the fastener 27 to the surface of the composite article 20.

Figure 3:
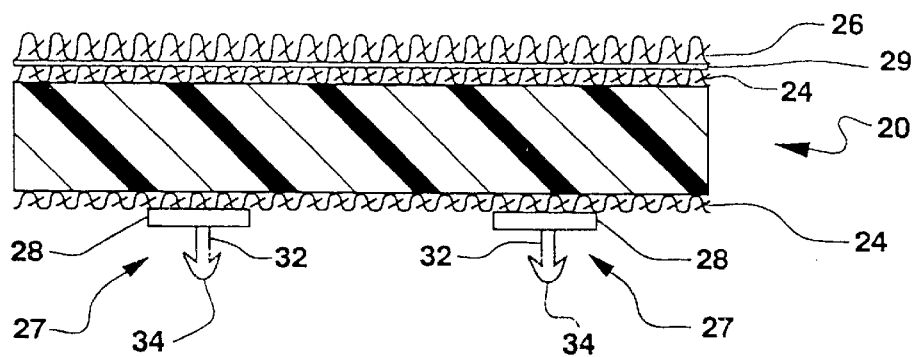
FIG. 3 is an end view of the composite article of the invention having the entire lower glass fiber reinforcing layer encapsulated by the binder, but wherein the binder encapsulation has been selectively removed from localized areas to which the fastening means have been affixed to the surface of the reinforcing layer during the affixation process carried out by spin welding.

Referring to FIG. 3, another embodiment of the invention is shown, in which both of the reinforcing layers 24 are completely encapsulated with the isocyanate thermosetting material. In order to properly affix the base 28 of the fastener 27 to the lower reinforcing layer 24, a method such as spin welding or vibration welding must be used. In this method, as the base 28 of the fastener 27 is melted, the binder resin is physically removed from the outer fibers of the reinforcing layer 24, thereby permitting the molten thermoplastic material of the base 28 of the fastener 27 to permeate the free outer fibers of the reinforcing layer 24, and thereafter become strongly affixed to the reinforcing layer 24 when the thermoplastic material is permitted to cool and harden.

Figure 4:
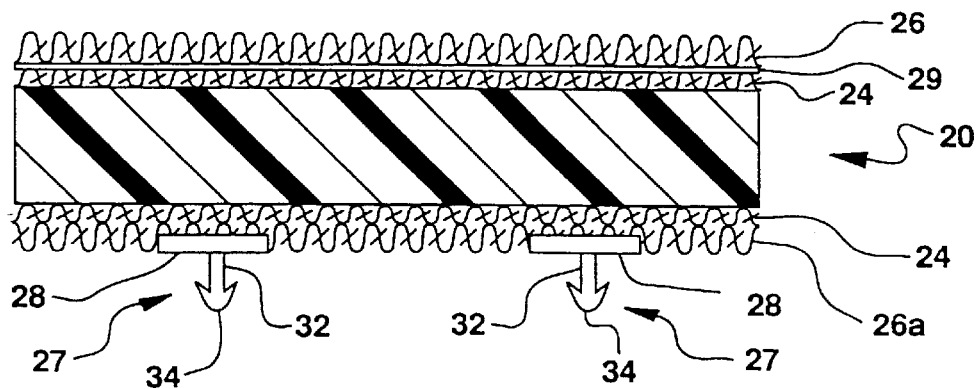
FIG. 4 is an end view of another embodiment of the composite article of the invention, similar to those shown in FIGS. 2 and 3, but having a decorative foam/scrim layer adhesively affixed to both reinforcing layers.

Referring to FIG. 4, a composite article similar to that of FIG. 3 is shown. Here however, a foam/scrim 26 and 26a is applied to both surfaces of the composite article. However, prior to affixing the fasteners 27, a portion of the foam/scrim 26a can be physically removed in the areas where the fasteners 27 are to be affixed.

Figure 5:
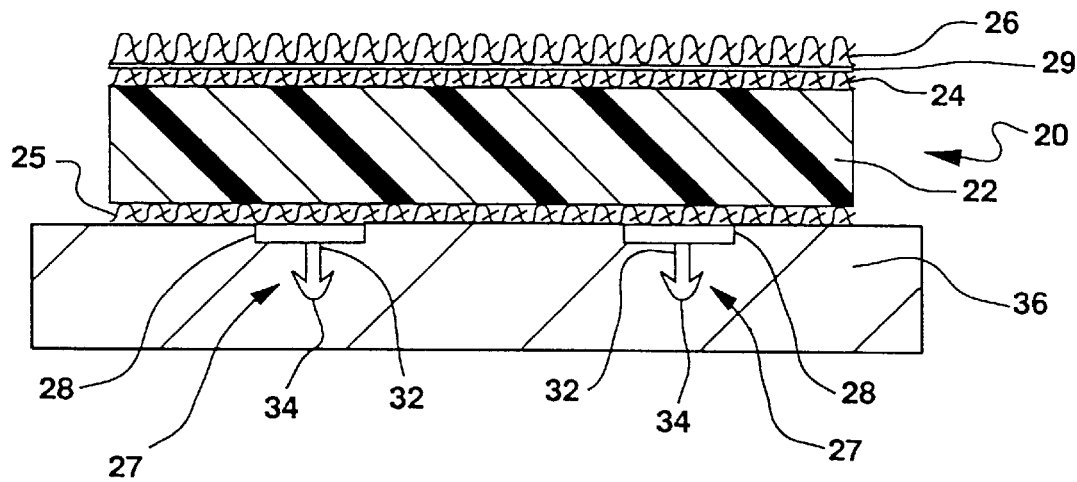
FIG. 5 is an end view of the composite article of the invention as shown in FIG. 2, attached to a supporting structure.

Referring to FIG. 5, a composite article 20 such as shown in FIG. 2 having fasteners 27 affixed to a surface of the article 20, is shown, with the hook 34 and a portion of the shaft 32 extending into a base structure 36 and strongly affixing the composite article 20 to the base structure 36.

Figure 6:
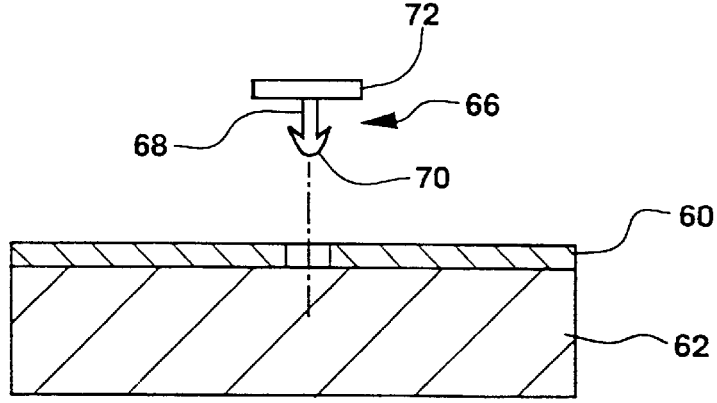
FIG. 6 is an end view of a prior art structure showing the fastening means adapted to extend through an aperture provided in the composite panel and used to attach the panel to a supporting structure.
Figure 7A:
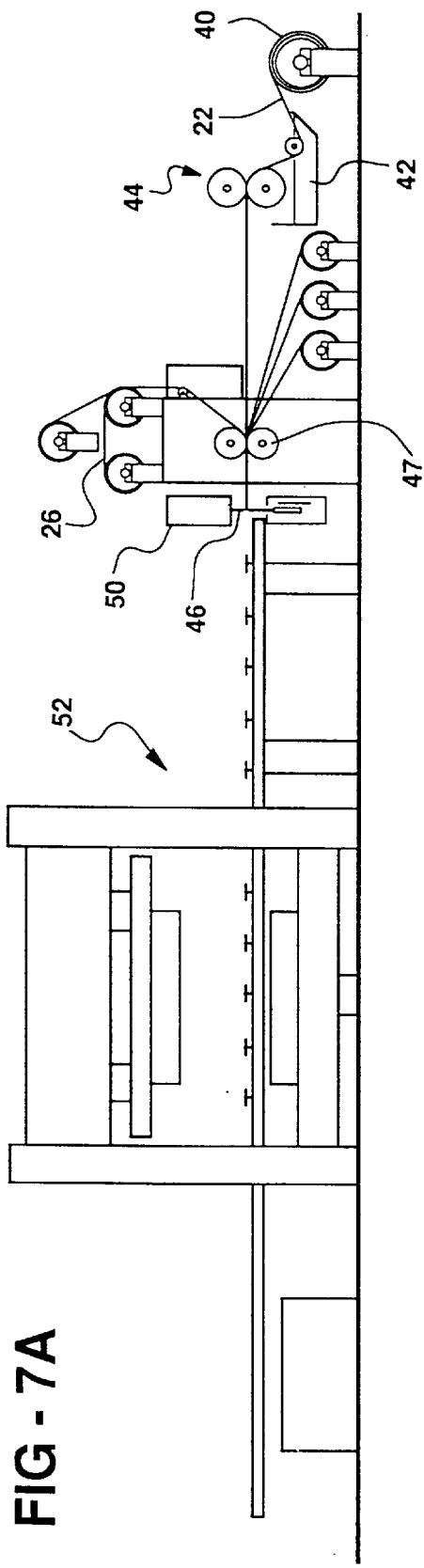
FIGS. 7A and 7B is a schematic representation of the process of making the composite article of the invention to which the fastening means are subsequently affixed.
Figure 7B:
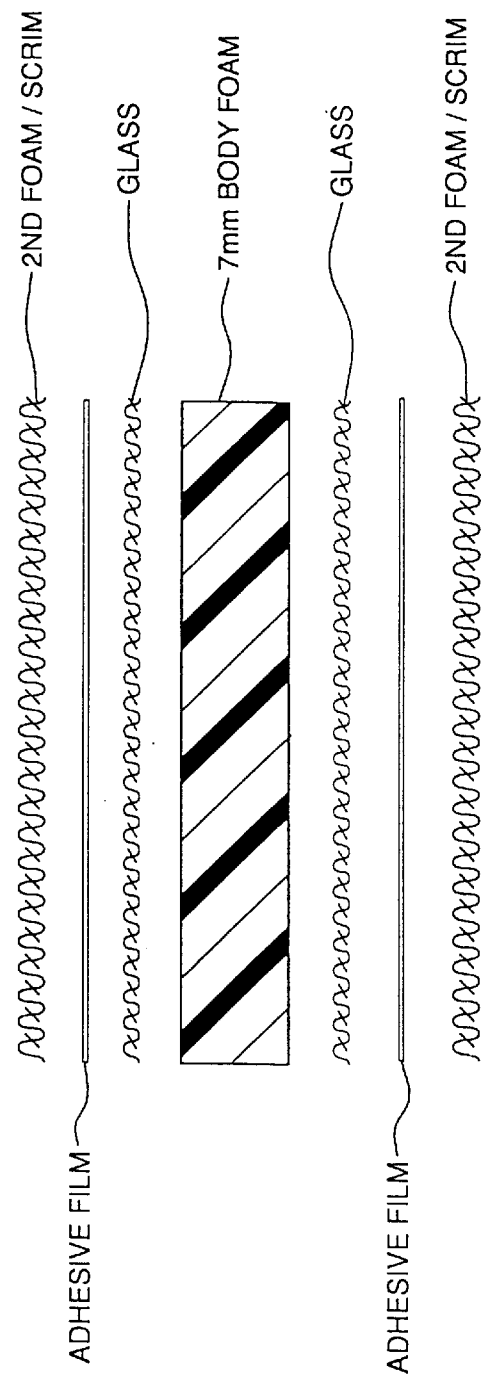

Referring to FIG. 6, a prior art method of affixing an article 60 formed with a thermosetting material to a base structure 62 is shown. Here the composite article 60 is provided with an aperture 64 extending through the entire thickness thereof. A fastener 66 is inserted in the aperture 64, with the shaft 68 and hook 70 further extending into the base structure 62 and the base 72 of the fastener 66 engaging the outer surface of the composite article 60 and holding it fast.

In preparing a preferred embodiment of the composite article of the present invention, the foam core 22 is fed from a stock reel which contains foam stock which has been previously sized to the desired thickness. In the present invention the thickness of the foam material is approximately 7 mm; however, the foam core 22 can be of any thickness and can be varied to meet manufacturing specifications. The foam which makes up the foam core 22 is unrolled from the stock reel 40 and passes through a binder bath 42 which contains the binder. In the preferred embodiment, the catalyst activatible liquid binder is preferably polymeric MDI (4-4'-diphenylmethane di-isocyanate). However, other isocyanates such as TDI (toluene di-isocyanate), IPDI (isophoronediisocyanate), phenyl isocyanate, and $H_{12}MDI$ may be used as substitutes for the MDI.

The MDI binder saturates the foam and through a process of polymerization of the MDI rigidizes the cell walls of the foam core 22 by forming isocyanurate linkages, urethane linkages, urea linkages, trimer linkages, biuret linkages, and/or allophante linkages. The binder functions as an adhesive to bind together the layers of the composite article.

The MDI saturated foam 22 exits the binder bath 42 and is compressed between a set of calender rolls 44 which are used to control the amount of MDI retained in the foam core 22. The amount of MDI saturation is commonly referred to as the saturant level. By controlling the saturant level (amount), it is possible to vary the rigidity of the article 20 produced. Since the degree of rigidity (soft ←→ hard) of the composite article 20 is a function of both the type and the amount of saturant present, i.e., % MDI, varying the type or the amount of saturant directly effects the rigidity of the composite article 20. That is, by controlling the amount of saturant in the foam 22 by either squeezing the saturant out of the foam 22 using the calender rolls 44 or by diluting or thinning the concentration of saturant in a suitable solvent such as 1,1,1-tricloroethane, propylene carbonate, or methylene chloride, a composite article 20 can be produced having any desired degree of resilience or yieldability. Therefore, a composite article 20 can be produced wherein the foam core 22 provides structural rigidity ranging from very soft (little or no structural support, very resilient) to very rigid (good structural support, not resilient). The saturant range can be from 300–1500 g (MDI) for 20 mm of foam.

The foam core 22 with the desired amount of MDI is then treated in a catalyst spray 46 with a polymerization catalyst which catalyzes the polymerization of the isocyanate and water. The catalyst is sprayed directly onto the MDI impregnated foam core 22 utilizing methods and apparatus known to those skilled in the art.

Catalysts utilized in the isocyanate chemistry are well known in the art. See, for example, U.S. Pat. No. 5,354,808 hereby incorporated by reference. Catalysts that may be utilized are amine catalysts, the catalysts may also be acids or organic bases. Typical organic bases include triethyl amine, pyridine and the like. While strong acids and Lewis acids may also be utilized. Other catalysts that may be used are organo metallic compounds such as tin derivatives.

Tailoring performance to improve processing properties of polyurethanes requires the selection of efficient catalysts. Generally, an increase in base strength in tertiary amines increases the catalytic strength, wherein the catalytic activity of tertiary amines is the result of the free electron pair on the nitrogen. The availability of the free electron pair for complexation is more important than its relative base strength. Typical amine catalysts useful in the present invention include triethyl-amine, and those known under the trade names "Dabco" (Air Products and Chemicals), "Niax" (Union Carbide Corporation), "Polycat" (Abbott), and "Thancat" (Jefferson Chemical Company).

Organometallic compounds useful in catalyzing the reaction of isocyanates with macroglycols include, di-n-butyltin dilaurate, as well as carboxylic acid salts of calcium, cobalt, lead, manganese, zinc, and zirconium employed as cocatalysts with tertiary amines, tin compounds and tin-amine combinations.

Following exit from the calender roll 44, the multi-layered composite 20 is assembled. The foam core 22 receives a fibrous reinforcing material in the form of a layer or mat of reinforcing fibers. The foam core 22 can receive one or more layers or mats of fibrous reinforcing material 24. Each surface of the foam core 22 typically receives a layer or mat of fibrous reinforcing material 24. The fibrous material which comprises the reinforcing material 24 can be of natural or synthetic material. Natural fibrous materials suitable for use in the reinforcing material 24 include animal or vegetable fibers. Suitable fibers may include glass fibers, synthetic fibers such as Kevlar®, or other synthetic fibers known to those skilled in the art. The preferred material for use in the reinforcing layer 24 is glass fiber.

The fibrous reinforcing material 24 is necessary in order to provide added strength and stiffness to the composite article 20. Additionally, because the reinforcing material 24 is typically constructed of chopped or random continuous fiber strand material, voids or interstitial spaces are created within the weave of the reinforcing material 24. These voids or interstitial spaces allow the heat accelerated binder compound, i.e., MDI, to flow through the voids or interstitial spaces and permeate and saturate the fibers of the reinforcing material 24. Saturation of the fibers of the reinforcing material 24 with the binder compound allows, upon catalyzation, for formation of a mechanical bond between the foam core 22 and the reinforcing material 24. That is, when the binder compound is catalyzed to form a thermosetting material, the same curing reaction that stiffens the foam core 22 mechanically bonds the reinforcing material 24 to the foam core forming an essentially integral layer.

After the reinforcing material 24 is applied to the foam core 22, an exterior or outer surface layer 26 can then be applied to the reinforcing material 24. The outer surface layer 26 can be any suitable material such as scrim, foam, or plastic sheet. The outer surface material 26 is chosen with a particular application in mind. That is, should a multi-layered composite panel 20 be required to have impact or energy absorbing characteristics, a foam exterior layer can be applied.

The scrim material can be any suitable material such as a polyester fabric, cellulose, rayon, nylon, propylene, vinyl, olefin, or other suitable thermoplastics known to those skilled in the art.

The outer surface layer 26 can be adhesively bonded directly to the reinforcing material 24 with the same MDI which bonds the reinforcing material 24 to the foam core.

However, in the preferred embodiment, an additional adhesive layer 29 (intermediate layer) is used to bond the exterior or surface layer 26 to the reinforcing material 24. The adhesive can be a film or sheet of a thermoplastic material such as a polyester, polyamide, or ethylacrylic acids (EAA, Dow Chemical) which melts or forms bonds at die molding and polymerization reaction temperatures. The adhesive layer 29 is applied to the reinforcing material 24 in between the layers of reinforcing material 24 and the exterior or surface layer 26. Under the heat of molding, the adhesive layer 28 melts and forms a bond between the reinforcing material 24 and the exterior or surface layer 26.

In addition to bonding the exterior or surface layer 26 to the reinforcing material 24, prior to melting, the adhesive layer 29 also serves as an occlusive barrier, preventing migration of the MDI to the exterior or surface layers 26. By preventing the migration of the MDI to the exterior or surface layers 26, i.e., a foam exterior layer, the surface characteristics of the foam exterior layer 26 can be maintained without the influence of the MDI hardening solution.

The adhesive layer or film 29 is positioned over the layers of reinforcing material 24, and finally the surface layer 26 of foam/scrim is applied to complete the formation of the composite article 20. Each of the constituents which comprise the multi-layered composite article 20, i.e., the reinforcing material 24, the adhesive layer 29, and the surface layers 26 are fed from continuous stock reels (shown in FIG. 2). The multi-layered composite 20 is then passed through a second set of calender rolls 48 which impregnate the reinforcing material 24 with the MDI, polymerization catalysts, and any other ingredients.

The continuous length of the multi-layered composite 20 is then conveyed through a shearing apparatus 50 which cuts the multi-layered composite 20 to desired length. The sheared lengths of the multi-layered composite 20 are then placed into a tenter frame (holding frame) (not shown). The tentered composite is then transported to a die press/mold 52.

The die press/mold 52 is maintained at a temperature between 200° F. and 400° F. It is at this temperature that the polymerization reaction occurs, and the foam core 22 becomes a rigid thermosetting plastic. The multi-layered composite 20 is pressed between male and female die halves to reproduce the configuration of the final article to be made such as automotive interior trim components e.g., headliners, dashboards, armrests, etc. The die pressed or molded multi-layered composite article 20 is then allowed to cure for between 15 to 90 seconds and is then removed the press/mold 52 for trimming and other post assembly processing.

Polyurea multi-layer composites are constructed by the following method. The method includes impregnating a sheet of open cell material, such as foam, with an isocyanate having at least one terminal -NCO group. Water is then applied to the isocyanate impregnated open celled material to cause the formation of the urea and biuret urethane linkages and impart rigidity to the composite article. Layers of reinforcing material can be applied over the open celled material to add additional strength to the composite article. As described above, surface layers such as scrim or foam can be applied over the reinforcing material either with or without the use of an additional adhesive material.

The composite material can then be molded under heat and pressure to cure the urethane reaction and form the rigid composite article.

In carrying out the preferred embodiment of the invention, the upper layer of reinforcing material 24 is completely encapsulated by the polyurethane thermosetting resin to affix the adhesive layer 29 to the foam layer 22, and a foam/scrim layer 26 is adhesively applied to the surface of the reinforcing material 24. However, a lower layer of reinforcing material 25 is only partially encapsulated, only sufficiently to affix the lower layer of reinforcing material 25 to the foam layer 22, but leaving the outer fibers of the reinforcing layer 25a free of the polyurethane thermosetting resin. As a result, when the bases 28 of the fasteners 27 are melted, the thermoplastic material of the fasteners 27 can permeate and infiltrate the free fibers of the reinforcing material 25a and become affixed thereto when the thermoplastic material becomes solidified.

In the case of the embodiments shown in FIGS. 3 and 4, even though the reinforcing layers 24 are completely encapsulated, the spin welding process, in addition to melting the base of the fastener, also results in simultaneously physically removing the urethane thermosetting resin from the outer fibers of the reinforcing material 24. The molten thermoplastic material of the fastener 27 can then permeate the free fibers of the reinforcing material 24 and become affixed thereto.

It is to be noted that the panel prepared by the spin welding technique as described herein does not utilize its separate application of an adhesive to secure fasteners. To permit the spin welding technique to be used, it has been found useful to apply light pressure on the spinning member of about 5–20 psi (pounds per sq. in.) for a brief period of time of generally less than 10 seconds.

Among the processes which can be utilized for melting and applying the fasteners to the reinforcing layer are spin welding, vibration welding, ultrasonic welding, and hot plate bonding. Spin welding is a well known technique for adhering plastic materials to each other. See, for example, U.S. Pat. No. 3,779,446; 3,993,519; 5,255,485; 4,987,714; 4,636,124; 4,599,768; 4,551,189; 5,064,485; 4,457,795; 5,108,539; and 4,075,820. These patents are hereby incorporated by reference.

Suitable thermoplastic for construction of the fasteners 27 include polyamide as nylon, acetal, polycarbonates, polyvinyl chloride, PC/ABS, polystyrenes, polyethylenes, polypropylene, acrylonitrile-butadiene-styrene (ABS) and the like.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

We claim:

1. A composite panel adapted to be affixed to a supporting structure comprising:

a base material;

a layer of a plurality of reinforcing fibers affixed to a surface of said base material by means of a thermosetting binder, said thermosetting binder permeating only a portion of said layer of reinforcing fibers but leaving another portion of said layer of reinforcing fibers free of said thermosetting binder; and one or more fastening means formed of a thermoplastic resin affixed to said layer of reinforcing fibers with a portion of the thermoplastic resin of said fastening means dispersed among the portion of said layer of reinforcing fibers free of said thermosetting binder.

2. A composite panel according to claim 1, wherein said fastening means comprises a base, a shaft, and a detent at the end of said shaft.

3. A composite panel according to claim 1, wherein the base of said fastening means is liquified and applied to said layer of reinforcing fibers by spin welding.

4. A composite panel according to claim 1, wherein said fastening means is formed of polystyrene.

5. A composite panel according to claim 1, wherein said fastening means is formed of polyethylene.

6. A composite panel according to claim 1, wherein said fastening means is formed of acrylonitrile-butadiene-styrene.

7. A composite panel according to claim 1, wherein said fastening means is formed of polyamide.

8. A composite panel according to claim 1, wherein said fastening means is formed of polycarbonate.

9. A composite panel according to claim 1, wherein said base material is formed of an open cell polyurethane foam.

10. A composite panel according to claim 1, wherein said fastening means is formed of acetal.

11. A composite panel according to claim 1, wherein said fastening means is formed of polypropylene.

12. A composite panel according to claim 1, wherein said thermosetting binder is an isocyanate having an -NCO group and a polymerization catalyst.

13. A composite panel according to claim 1 which is affixed to a supporting structure with said fastening means embedded in said supporting structure.

14. A composite panel adapted to be affixed to a supporting structure comprising:

a base material;

a layer of a plurality of reinforcing fibers affixed to a surface of said base material by means of a thermoset binder permeating the entire layer of reinforcing fibers; and one or more fastening means formed of a thermoplastic resin affixed to said layer of reinforcing fibers by spin welding, a portion of said thermoset binder having been removed from the fibers at the surface of said layer and a portion of the thermoplastic resin of said fastening means dispersed among the portion of said layer of reinforcing fibers free of said thermosetting binder by spin welding, and subsequently permitted to solidify.

* * * * *